United States Patent
Kato et al.

(10) Patent No.: US 8,720,293 B2
(45) Date of Patent: May 13, 2014

(54) SHIFT LEVER DEVICE

(75) Inventors: Masashi Kato, Aichi (JP); Yoshinobu Yokoyama, Aichi (JP)

(73) Assignee: Kabushiki Kaisha Tokai-Rika-Denki-Seisakusho, Aichi-Ken (JP)

(*) Notice: Subject to any disclaimer, the term of this patent is extended or adjusted under 35 U.S.C. 154(b) by 1671 days.

(21) Appl. No.: 11/578,976

(22) PCT Filed: Mar. 29, 2005

(86) PCT No.: PCT/JP2005/005857
§ 371 (c)(1),
(2), (4) Date: Oct. 18, 2006

(87) PCT Pub. No.: WO2005/102763
PCT Pub. Date: Nov. 3, 2005

(65) Prior Publication Data
US 2007/0214907 A1 Sep. 20, 2007

(30) Foreign Application Priority Data

Apr. 19, 2004 (JP) .................................. 2004-123138

(51) Int. Cl.
*F16H 59/02* (2006.01)
*F16H 59/10* (2006.01)

(52) U.S. Cl.
USPC ... 74/473.33; 74/473.3; 74/473.1; 74/471 XY

(58) Field of Classification Search
USPC ................ 74/473.1, 473.23, 473.21, 473.22, 74/473.12, 473.33, 519, 529, 473.18, 74/471 XY
See application file for complete search history.

(56) References Cited

U.S. PATENT DOCUMENTS

| 5,490,434 | A | | 2/1996 | Osborn et al. |
| 5,749,268 | A | * | 5/1998 | Nishimura .................... 74/473.3 |
| 6,029,537 | A | * | 2/2000 | Nagao .......................... 74/473.33 |
| 6,148,686 | A | * | 11/2000 | Kataumi ..................... 74/473.18 |
| 6,461,073 | B1 | * | 10/2002 | Ikegami ........................ 403/375 |

FOREIGN PATENT DOCUMENTS

| EP | 1 450 073 A2 | 8/2004 |
| JP | 59-162329 U | 10/1984 |
| JP | 61-115228 U | 7/1986 |
| JP | 62-102723 U | 6/1987 |
| JP | 63-48628 U | 4/1988 |
| JP | 2000-38047 A | 2/2000 |
| JP | 2000-43600 A | 2/2000 |
| JP | 2002-29275 A | 1/2002 |
| WO | 01/11271 A1 | 2/2001 |

OTHER PUBLICATIONS

Supplementary European Search Report dated Jan. 9, 2009 from corresponding European Patent Application No. EP 05 72 7543.

* cited by examiner

*Primary Examiner* — Daniel Yabut
(74) *Attorney, Agent, or Firm* — Roberts Mlotkowski Safran & Cole P.C.

(57) ABSTRACT

A shift lever device for operating a vehicle mounted transmission by pivoting operation of a shift lever about a predetermined axis is disclosed, and in this shift lever device, a housing is configured by a first housing member that is disposed on one side of the shift lever in a predetermined direction and a second housing member that assemblable to the first housing member along the predetermined direction from the side of the shift lever opposite to the side facing the first housing member with the shift lever therebetween, and the shift lever is axially supported inside the housing such that the shift lever is pivotable about an axis whose axial direction is the predetermined direction.

6 Claims, 6 Drawing Sheets

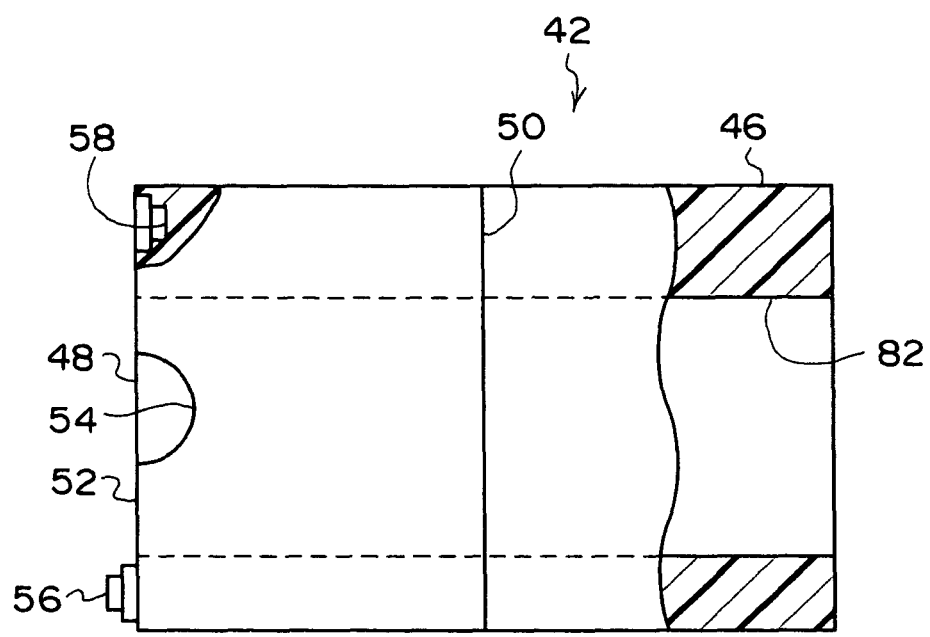
F I G. 3

F I G. 4
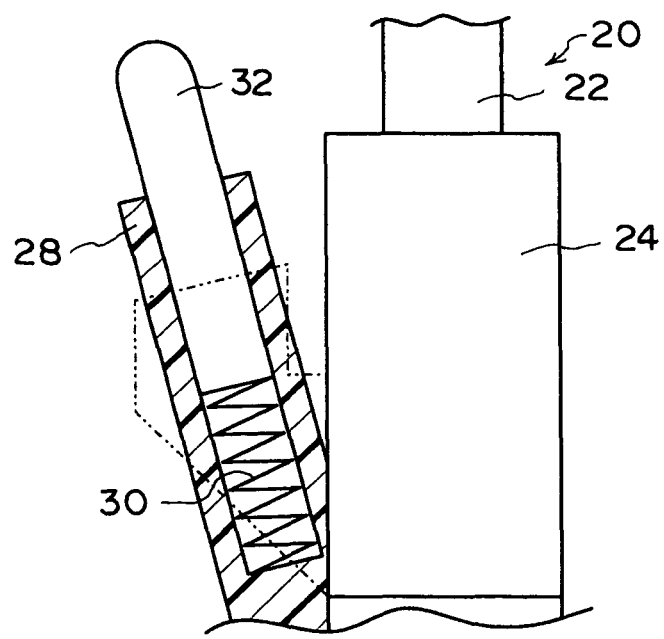

SHIFT LEVER DEVICE

TECHNICAL FIELD

The present invention relates to a shift lever device for operating a transmission fitted to a vehicle.

BACKGROUND ART

In an automatic transmission of a vehicle, plural shift ranges are set in advance and an operating device for selecting and operating these plural shift ranges is disposed in the vehicle. A shift lever device is widely used as this type of operating device, and an example thereof is disclosed in Patent Document 1 described below.

The shift lever device disclosed in Patent Document 1 will be described briefly below.

The shift lever device disclosed in Patent Document 1 is disposed with a bracket. The bracket is disposed with a pair of wall portions that face each other in the substantial left-right direction of the vehicle. End portions of these side portions at the substantial rear side of the vehicle are integrally coupled together by a rear wall (in Patent Document 1, names are not particularly given to the wall portions and the rear wall; rather, they are all collectively referred to as the "bracket").

Moreover, a plate is disposed on the outer side of each wall portion of the bracket. Each of the plates is fixed to the corresponding bracket by screws. These plates are further fixed to a steering hanger bracket and the like. Thus, the shift lever device is attached to the vehicle.

A shift lever (in Patent Document 1, this is called an "operating lever") is disposed inside the bracket, that is, between both wall portions. An insertion hole is formed in the proximal end portion of the shift lever. The insertion hole penetrates the shift lever along the direction in which both wall portions face each other. Support sites including holes are formed in both wall portions in correspondence to the insertion hole, and slits are formed in both plates in correspondence to the insertion hole.

Further, a support shaft is inserted through the slit in one of the plates. The distal end side of the support shaft inserted through the slit in one of the plates is passed through the hole of the support site of one of the wall portions, through the insertion hole in the shift lever, through the hole of the support site of the other of the wall portions, and through the slit in the other of the plates, and is fixed by a fastener. In this manner, the shift lever is rotatably supported about the support shaft by the support shaft, both of whose ends are supported in both support sites.

Further, a link attachment portion is disposed in the shift lever, and one end of a transmitting member such as a wire is anchored to this link attachment portion. The other end of the transmitting member is directly or indirectly connected to an automatic transmission, and when the shift lever is rotated about the support shaft, the transmitting member is displaced and the automatic transmission is operated in an amount equal to this displacement.

Patent Document 1: JP-A No. 2002-29275

DISCLOSURE OF THE INVENTION

Problems that the Invention is to Solve

When the shift lever device disclosed in Patent Document 1 is assembled, the number of working man-hours is large and the number of parts is also large because, in addition to the work of assembling the shift lever by inserting the support shaft and fixing the support shaft by the fastener in a state where the shift lever is disposed between both wall portions of the bracket, fastening work to fix the plates by screws to both wall portions is required. For this reason, there has been the problem that this leads to an increase in costs. Moreover, when the shift lever is disposed between both wall portions of the bracket by the work of assembling the shift lever, the support shaft cannot be inserted without causing the insertion hole in the shift lever and the holes of the support sites formed in both wall portions to face each other coaxially.

Moreover, structures such as housing portions and attachment portions for housing a solenoid configuring a shift lock mechanism and a light that emits light at night are formed between both wall portions, and the shape becomes complicated between both wall portions. For this reason, there has been the problem that the structures formed on the inside between the two wall portions inhibit the shift lever during the task of disposing the shift lever between both wall portions, and thus it has been difficult to easily dispose and assemble the shift lever between both wall portions.

In view of the above circumstances, it is an object of the present invention to obtain a shift lever device that can improve the operability of assembly work including the work of assembling the shift lever and the like.

Means for Solving the Problems

According to a first aspect of the invention, there is provided a shift lever device for operating a vehicle mounted transmission by pivoting operation of a shift lever about a predetermined axis, the shift lever device including a housing configured by a first housing member that is disposed on one side of the shift lever in a predetermined direction and a second housing member that is assemblable to the first housing member along the predetermined direction from the side of the shift lever opposite to the side facing the first housing member with the shift lever therebetween. The shift lever is axially supported inside the housing such that the shift lever is pivotable about an axis whose axial direction is the predetermined direction.

According to a second aspect of the invention, there is provided a shift lever device for operating a vehicle mounted transmission by pivoting operation of a shift lever about a predetermined axis, the shift lever device including a shift lever, and a housing configured by a first housing member that is disposed on one side of the shift lever in a predetermined direction and a second housing member that is assemblable to the first housing member along the predetermined direction from the side of the shift lever opposite to the side facing the first housing member with the shift lever therebetween. The shift lever is axially supported inside the housing such that the shift lever is pivotable about an axis whose axial direction is the predetermined direction. The shift lever is configured to include a first lever member that is directly or indirectly axially supported inside the housing such that the first lever member is pivotable about an axis whose axial direction is the predetermined direction and a second lever member disposed with a pivot shaft that extends in a direction intersecting the predetermined direction. The shift lever device also includes first and second bearing members where one is assemblable to the other from the predetermined direction with the first lever member therebetween such that they are fixed integrally coupled to the first lever member. Supports disposed on both the first and the second bearing members sandwich the pivot shaft from the predetermined direction such that the pivot shaft is pivotably supported by both the supports in a state where the first bearing member is coupled to the second bearing member. The shift lever device also includes fastener that penetrates the first housing member and the second housing member along the predetermined direction, penetrates the shift lever between the first housing member and the second housing member, and supports the shift lever such that the shift lever is pivotable about an axis whose axial direction is the predetermined direction. The shift lever configured to include the first lever member and the second lever member integrally coupled together by the first and second bearing members is operated by pivoting about an axis whose axial direction is the predetermined direction and about an axis whose axial direction is the direction of extension of the pivot shaft.

Effects of the Invention

As described above, the shift lever device pertaining to the present invention can improve the operability of assembly work.

BRIEF DESCRIPTION OF THE DRAWINGS

FIG. 3
A side view of the bearing member.
FIG. 4
A cross-sectional view of a cylinder housing a moderating pin.

BEST MODE FOR IMPLEMENTING THE INVENTION

Configuration of First Embodiment

Figure 1:
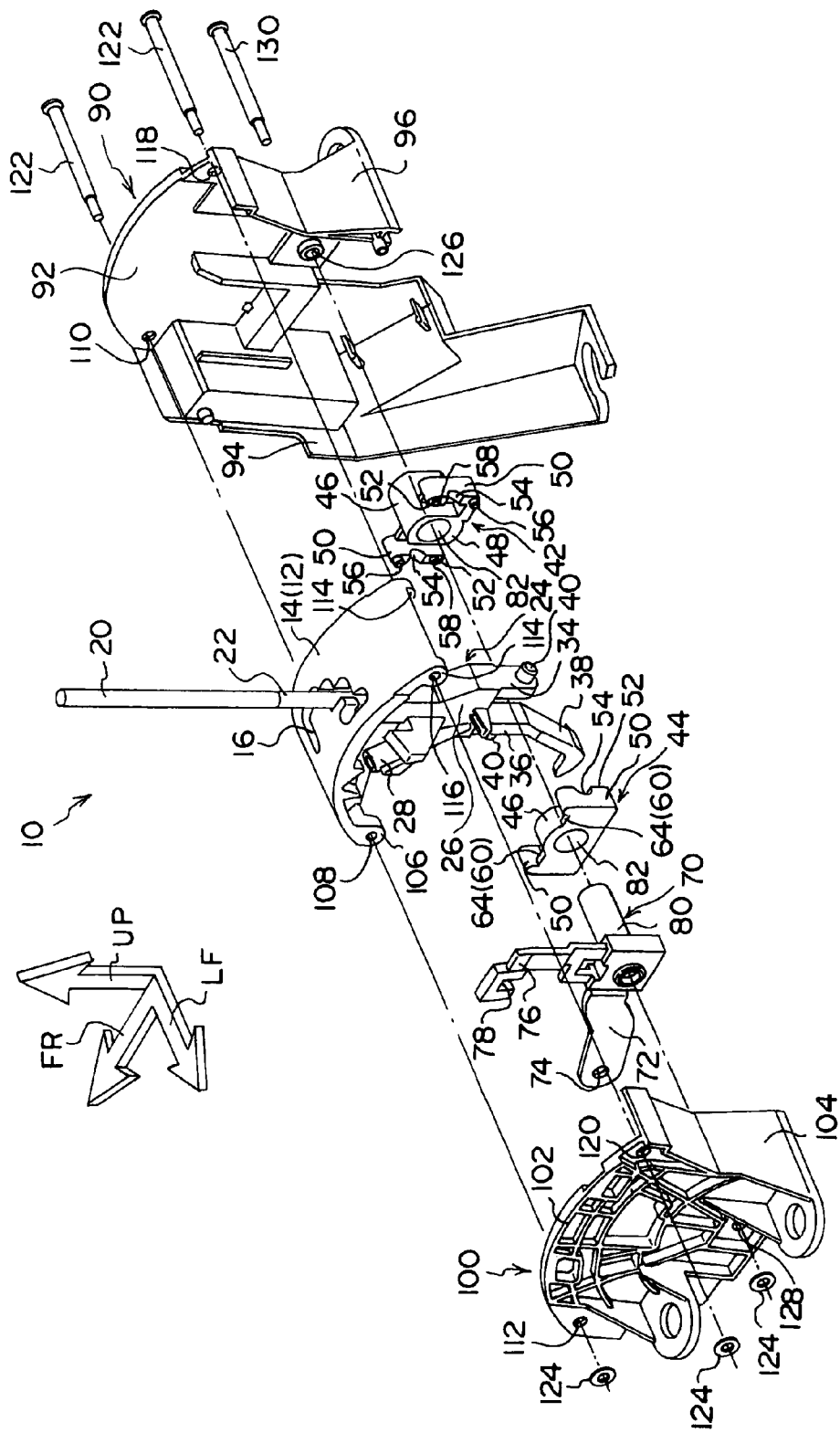
FIG. 1
An exploded perspective view of relevant portions of a shift lever device pertaining to a first embodiment of the invention.

In FIG. 1, a perspective view is shown where relevant portions of a shift lever device 10 pertaining to a first embodiment of the invention are exploded.

As shown in FIG. 1, the shift lever device 10 is disposed with a housing 12. The housing 12 is disposed with an upper wall 14 formed by a synthetic resin material. The upper wall 14 is generally formed by a synthetic resin material such that the upper wall 14 has a plate shape whose thickness direction is along the vertical direction (the direction of arrow UP in FIG. 1 and the opposite direction) of the shift lever device 10 and also has a curved concave shape that opens substantially downward in the vertical direction.

Figure 5:
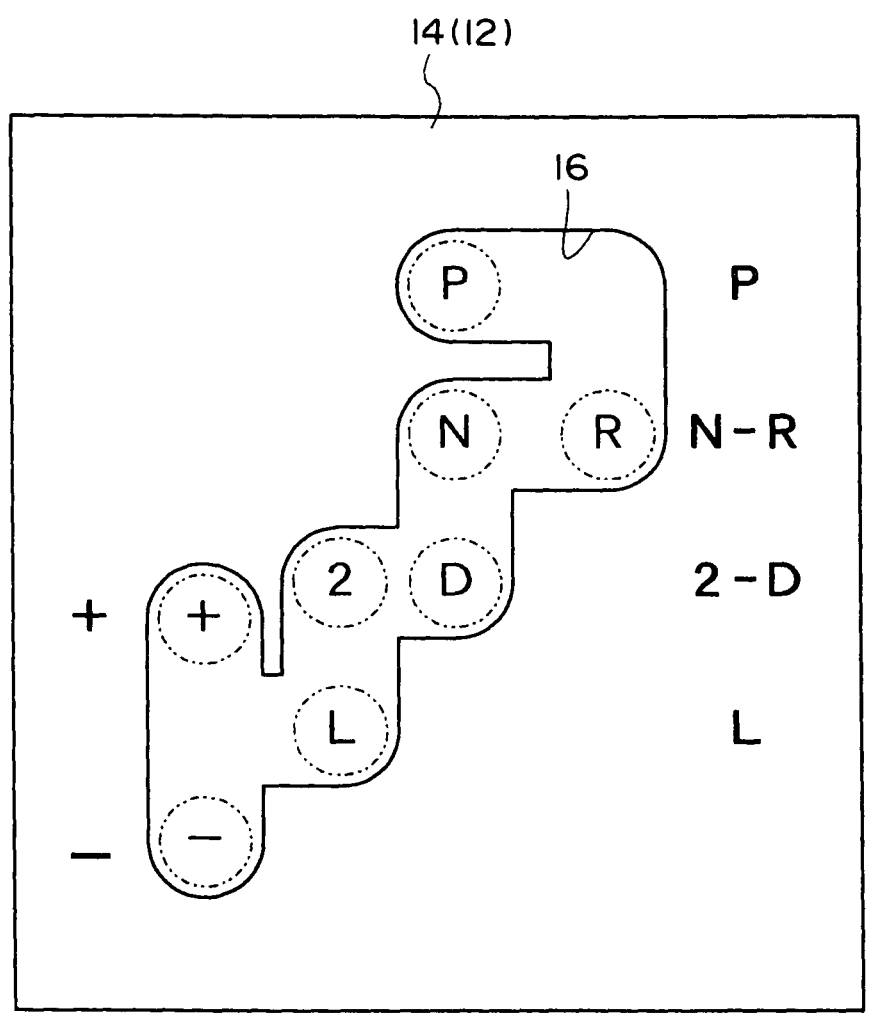
FIG. 5
A plan view of a housing.

As shown in FIG. 1 and FIG. 5, a shift groove 16 is formed in the upper wall 14. The shift groove 16 appropriately bends in the longitudinal direction (the direction of arrow FR in FIG. 1 and FIG. 5 and the opposite direction) and in the width direction (the direction of arrow LF in FIG. 1 and FIG. 5 and the opposite direction) of the upper wall 14, and penetrates the thickness direction of the upper wall 14.

A lever body 22 serving as a second lever member of a shift lever 20 penetrates the shift groove 16. The lever body 22 is configured as a round rod whose outer diameter dimension is smaller than the width dimension of the shift groove 16, and an unillustrated knob for gripping is integrally fixed to the distal end portion of the lever body 22.

A bracket 24 is integrally fixed to the proximal end portion of the lever body 22. The bracket 24 is disposed with a block-shaped body 26. A cylinder 28 is integrally formed on the body 26. The cylinder 28 is formed in a bottomed cylinder shape where the cross-sectional shape of the inner peripheral portion is circular and the upper end is open, and as shown in FIG. 4, a compression coil spring 30 is housed inside the cylinder 28.

Moreover, a moderating pin 32 is housed in the cylinder 28 further toward the upper end side of the cylinder 28 than the compression coil spring 30. The moderating pin 32 is formed in a substantially hemispherical column shape and is biased toward the upper end side of the cylinder 28 by the biasing force of the compression coil spring 30.

An unillustrated moderating groove is formed in the underside of the upper wall 14 in correspondence to the distal end of the moderating pin 32. The moderating groove is formed in a shape similar to that of the shift groove 16, but in contrast to the shift groove 16, does not penetrate the upper wall 14 but is configured as a bottomed groove that opens to the underside of the upper wall 14, so that the distal end of the moderating pin 32 pressingly contacts the bottom portion of the moderating groove by the biasing force of the compression coil spring 30. Moreover, the bottom portion (upper bottom portion) of the moderating groove is configured as a slanted surface that appropriately slants with respect to the surface (top side) of the upper wall 14.

Further, leg plates 34 and 36 extend from the lower surface of the body 26 of the bracket 24 toward the side opposite from the lever body 22. The leg plate 34 extends from the lower end portion of the body 26 along the end portion of the body 26 at one side (in the present embodiment, the side opposite from arrow FR in FIG. 1) along the longitudinal direction of the upper wall 14.

The leg plate 34 is configured as a narrow plate whose thickness direction is along the longitudinal direction of the upper wall 14. Correspondingly, the leg plate 36 extends from the lower end portion of the body 26 along the end portion of the body 26 at the other side (in the present embodiment, the arrow FR side in FIG. 1) along the longitudinal direction of the upper wall 14. The leg plate 36 is also configured as a narrow plate whose thickness direction is along the longitudinal direction of the upper wall 14. A substantially hook-shaped inhibiting piece 38 is formed continuously from the lower end portion of the leg plate 36. A shift lock device (not shown) is disposed in the shift lever device 10 in correspondence to the inhibiting piece 38, and when the shift lock device is actuated and is inhibited by the inhibiting piece 38, the shift lock device regulates the rotation of the shift lever 20 from a predetermined shift position (e.g., position "P" in FIG. 5).

Further, circular column-shaped pins 40 serving as rotating shafts respectively protrude coaxially with each other from the surface of the leg plate 34 opposite from the side facing the leg plate 36 and from the surface of the leg plate 36 opposite from the side facing the leg plate 34.

A bearing member 42 is disposed on one side of the leg plates 34 and 36 along the width direction of the upper wall 14, and a bearing member 44 is disposed on the other side. The orientations of the bearing members 42 and 44 along the width direction of the upper wall 14 are opposite but their structures are the same. Consequently, just the structure of the bearing member 42 will be described, and description in relation to the structure of the bearing member 44 will be omitted.

Figure 2:
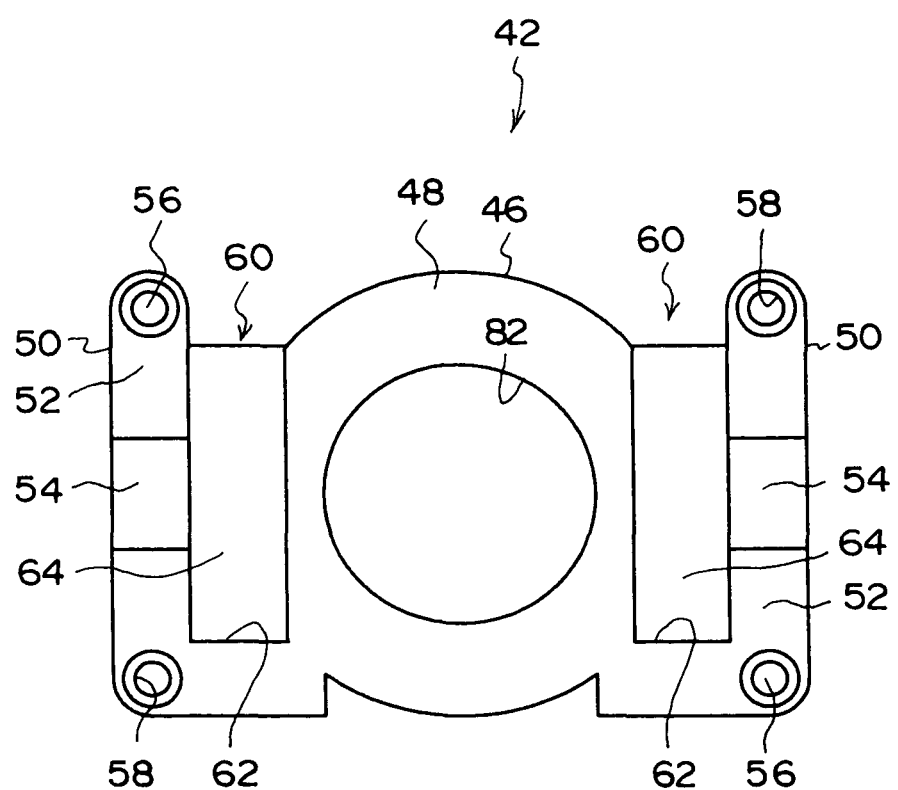
FIG. 2
A front view of a bearing member.

As shown in FIG. 2 and FIG. 3, the bearing member 42 is disposed with a body 46. The body 46 is formed in a block shape having a substantially elliptical shape in front view (i.e., a shape where both of the short edges of a rectangle are curved such that they stick outward).

The width dimension of the body 46 is just slightly smaller than the distance between the leg plate 34 and the leg plate 36, and the body 46 is fitted between the leg plate 34 and the leg plate 36 in a state where its width direction is along the direction in which the leg plate 34 and the leg plate 36 face each other, that is, along the longitudinal direction of the upper wall 14. In a state where the body portions 46 of both of the bearing members 42 and 44 have been fitted between the leg plate 34 and the leg plate 36, mutually facing end surfaces 48 of both of the bodies 46 abut against each other at substantial width-direction center portions of the leg plates 34 and 36.

In the present embodiment, the end surfaces 48 of both of the bodies 46 abut against each other in a state where they are positioned in the substantial width-direction centers of the leg plates 34 and 36 in a state where both of the bodies 46 have been fitted between the leg plates 34 and 36 in this manner, but the configuration of the bearing member 42 is not limited to this. In a state where both of the bodies 46 have been fitted between the leg plates 34 and 36, the end surfaces 48 of both of the bodies 46 may be displaced further toward either side in the width direction of the leg plates 34 and 36 than the substantial width-direction centers thereof, or the end surface 48 of one of the bodies 46 may be separated from the end surface 48 of the other of the bodies 46.

Further, a support 50 is disposed on each width-direction sides of the body 46. The supports 50 are formed in block shapes having a width that is smaller than that of the body 46. End surfaces 52 of the supports 50 facing the same direction as the end surface 48 of the body 46 are in the same position as the end surface 48 of the body 46 along the thickness direction of the body 46.

Substantially semicircular cutout portions 54 serving as support portions are formed in the end surfaces 52. The radial dimensions (radii of curvature) of the cutout portions 54 are just slightly larger than the radial dimensions of the outer peripheral portions of the pins 40. Consequently, when the end surfaces of the bodies 46 of both of the bearing members 42 and 44 abut against each other coaxially (i.e., such that the body 46 of the bearing member 44 is not shifted in either the longitudinal direction or the width direction with respect to the body 46 of the bearing member 42) along the thickness direction of the bodies 46, the end surfaces 52 of both of the bearing members 42 and 44 abut against each other, the cutout portions 54 formed in the end surfaces 52 of both face each other, and circular holes that penetrate the width direction of the supports 50 are formed by the cutout portions 54 of both.

In this manner, the pins 40 shown in FIG. 1 enter the circular holes formed by the cutout portions 54 of both, and the pins 40 are supported by the circular holes such that the pins 40 are rotatable about their own axes.

Moreover, a joining protrusion 56 protrudes from one longitudinal-direction end side of the end surface 52 of the support 50 disposed on one width-direction side of the body 46. Further, a joining hole 58 whose inner diameter dimension is just slightly larger than the outer diameter dimension of the joining protrusion 56 (i.e., such that they can be fitted together) is formed in the other longitudinal-direction end side of the end surface 52 of this support 50.

Correspondingly, a joining protrusion 56 and a joining hole 58 are formed at the end surface 52 of the support 50 disposed on the other width-direction side of the body 46. However, the joining hole 58 in the support 50 disposed on the other width-direction side of the body 46 is formed in the one longitudinal-direction end side of the end surface 52, and the joining protrusion 56 is formed on the other longitudinal-direction end side of the end surface 52.

As described above, the bearing member 42 and the bearing member 44 have identical shapes but their orientations along the width direction of the upper wall 14 are opposite. Consequently, in a state where the end surfaces 48 of the bodies 46 of both of the bearing members 42 and 44 face each other coaxially (i.e., such that the body 46 of the bearing member 44 is not shifted in either the longitudinal direction or the width direction with respect to the body 46 of the bearing member 42), the joining protrusions 56 formed on the bearing member 42 coaxially face the joining holes 58 formed in the bearing member 44, and the joining holes 58 formed in the bearing member 42 coaxially face the joining protrusions 56 formed on the bearing member 44.

Moreover, an adhesive is applied to the end surfaces 52 of at least either one of the bearing members 42 and 44 and to the joining protrusions 56 and the inner peripheral portions of the joining holes 58 formed at these end surfaces 52, so that when both of the bodies 46 of the bearing members 42 and 44 are fitted between the leg plates 34 and 36 and both end surfaces 48 and both end surfaces 52 abut against each other, the supports 50 of the bearing member 42 and the supports 50 of the bearing member 44 are joined together by the adhesive.

Further, coupling pieces 60 are disposed between the body 46 and both of the supports 50, and the body 46 and both of the supports 50 are integrally coupled together via the coupling pieces 60. Each of the coupling pieces 60 is configured by a horizontal plate 62 and a vertical plate 64 such that they have substantial "L" shapes when seen in side view.

The horizontal plates 62 are coupled to the vertical plates 64 at end portions opposite from the end surfaces 48 and 52, and the dimension from the end surfaces of the vertical plates 64 at the side of the end surfaces 48 and 52 is sufficiently longer than half the width dimension of the leg plates 34 and 36, so that the leg plates 34 and 36 are not inhibited by the vertical plates 64 until the pins 40 supported in the circular holes formed by the cutout portions 54 of both the bearing members 42 and 44 rotate a predetermined angle about their axes.

As shown in FIG. 1, the shift lever device 10 is also disposed with a control lever 70 serving as a first lever member. The control lever 70 is disposed with a coupling piece 72. The coupling piece 72 is formed in a narrow plate shape whose thickness direction is along the width direction of the upper wall 14, and a hook-and-lock hole 74 is formed in the distal end side of the coupling piece 72.

The hook-and-lock hole 74 penetrates the thickness direction of the coupling piece 72, and one end of a transmitting member (not shown) configured by a wire or a cable is hooked and locked in the hook-and-lock hole 74. The other end of the transmitting member is directly or indirectly connected to an automatic transmission (not shown) installed in the vehicle, and the automatic transmission is operated in accordance with the displacement amount of the transmitting member resulting from the rotation of the coupling piece 72 about an axis whose axial direction is the width direction of the upper wall 14 at the proximal end portion of the coupling piece 72.

Further, an inhibiting piece 76 is formed at the longitudinal-direction proximal end portion of the coupling piece 72. The inhibiting piece 76 is a direction slanted a predetermined angle with respect to the longitudinal direction of the coupling piece 72 around an axis whose axial direction is the width direction of the upper wall 14 is the longitudinal direction of, and a substantially "U" shaped inhibiting portion 78 is formed on the distal end side of the inhibiting piece 76 opening toward the proximal end thereof.

The inhibiting portion 78 is configured such that a regulating member of a lock mechanism such as a rotation inhibiting mechanism or the like can fit therewith, and has a structure where, when the lock mechanism is actuated and the regulating member of the lock mechanism enters the inhibiting portion 78, the rotation of the inhibiting piece 76 and the coupling piece 72 about an axis whose axial direction is the width direction of the upper wall 14 is restricted.

Moreover, a shaft 80 is formed at the proximal end portion of the coupling piece 72. The shape 80 is formed in a circular cylinder shape whose axial direction is the width direction of the upper wall 14, is open at its distal end portion, and is also open at the opposite end surface of the coupling piece 72 from the shaft 80 at the position where the shaft 80 joins to the coupling piece 72.

In correspondence to the shaft 80, insertion holes 82 are formed in the bodies 46 of both of the bearing members 42 and 44. The inner diameter dimensions of the insertion holes 82 are just slightly larger than the outer diameter dimension of the shaft 80, and the shaft 80 penetrates both of the insertion holes 82 in the bearing members 42 and 44.

A first housing member 90 that is formed overall by a synthetic resin material is disposed on one width-direction side of the upper wall 14. The first housing member 90 is disposed with a side wall 92 whose thickness direction is along the width direction of the upper wall 14. The first housing member 90 is also disposed with a front wall 94.

The thickness direction of the front wall 94 is generally along the longitudinal direction of the upper wall 14, and the width dimension of the front wall 94 along the same direction as the width direction of the upper wall 14 is set to be about the same as the width dimension of the upper wall 14. Moreover, an end portion of the front wall 94 at one side in the width direction of the upper wall 14 is connected to an end portion of the side wall 92 at one side in the longitudinal direction of the upper wall 14.

Further, the first housing member 90 is disposed with a rear wall 96. The thickness direction of the rear wall 96 is generally along the longitudinal direction of the upper wall 14, and the width dimension of the rear wall 96 along the same direction as the width direction of the upper wall 14 is set to be about ½ the width dimension of the upper wall 14. Moreover, an end portion of the rear wall 96 at one side along the width direction of the upper wall 14 is connected to an end portion of the side wall 92 at the other side along the longitudinal direction of the upper wall 14.

Correspondingly, a second housing member 100 that is formed overall by a synthetic resin material is disposed on the other width-direction side of the upper wall 14. The second housing member 100 is disposed with a side wall 102 whose thickness direction is along the width direction of the upper wall 14.

Further, the second housing member 100 is disposed with a rear wall 104. The thickness direction of the rear wall 104 is generally along the longitudinal direction of the upper wall 14, and the width dimension of the rear wall 104 along the same direction as the width direction of the upper wall 14 is set to be about ½ the width dimension of the upper wall 14.

Moreover, an end portion of the rear wall 104 at one side along the width direction of the upper wall 14 is connected to an end portion of the side wall 102 at the other side along the longitudinal direction of the upper wall 14. The shape of this width-direction end surface of the rear wall 14 is substantially the same as the shape of the width-direction end surface of the rear wall 96 of the first housing member 90.

The upper end side of the surface of the side wall 92 of the first housing member 90 facing the second housing member 100 abuts against one width-direction end of the upper wall 14, and the upper end side of the surface of the side wall 102 of the second housing member 100 facing the first housing member 90 abuts against the other width-direction end of the upper wall 14.

In a state where both of the side walls 92 and 102 abut against the upper wall 14, the width-direction end surface of the rear wall 96 and the width-direction end surface of the rear wall 104 abut against each other, and part of the width-direction end surface of the front wall 94 abuts against the vicinity of the end portion of the side wall 102 at one end side along the longitudinal direction of the upper wall 14. Thus, basically the portion of the shift lever 20 positioned at the underside of the upper wall 14 is enclosed by the first housing member 90 and the second housing member 100.

Further, coupling portions 106 extend from both width-direction end sides in the vicinity of one longitudinal-direction end portion of the upper wall 14 toward the underside (in FIG. 1, only one of the coupling portions 106 is shown). Through holes 108 that penetrate the coupling portions 106 along the width direction of the upper wall 14 are formed in the coupling portions 106 such that the through holes 108 are coaxial with each other. In correspondence to the coupling portions 106, a through hole 110 is formed in the side wall 92 of the first housing member 90 and a through hole 112 is formed in the side wall 102 of the second housing member 100.

Moreover, coupling portions 114 extend from both width-direction end sides in the vicinity of the other longitudinal-direction end portion of the upper wall 14 toward the underside. Through holes 116 that penetrate the coupling portions 114 along the width direction of the upper wall 14 are formed in the coupling portions 114 such that the through holes 116 are coaxial with each other. In correspondence to the coupling portions 114, a through hole 118 is formed in the side wall 92 of the first housing member and a through hole 120 is formed in the side wall 102 of the second housing member 100.

As described above, in a state where the upper end portions of the side wall 92 of the first housing member 90 and the side wall 102 of the second housing member 100 abut against both width-direction ends of the upper wall 14, the through holes 110 and 112 become substantially coaxial with respect to the through holes 108, and the through holes 118 and 120 become substantially coaxial with respect to the through holes 116. Moreover, fastening pins 122 are inserted through the through holes 110 and 118 from the side of the side wall 92 opposite from the side facing the upper wall 14.

The distal end side of the fastening pin 122 inserted through the through hole 110 penetrates the through holes 108 and 112 and protrudes from the side of the side wall 102 opposite from the side facing the upper wall 14. Further, the distal end side of the fastening pin 122 inserted through the through hole 118 penetrates the through holes 116 and 120 and protrudes from the side of the side wall 102 opposite from the side facing the upper wall 14.

Fasteners 124 are attached to the distal end sides of the fastening pins 122 protruding through the through holes 112 and 120, and the upper wall 14, the first housing member 90, and the second housing member 100 are fastened and fixed together by the fasteners 124 and the head portions of the fastening pins 122.

Moreover, an insertion hole 126 is formed in the side wall 92 and an insertion hole 128 is formed in the side wall 102. The insertion holes 126 and 128 are formed such that they are coaxial with each other in the fastened state (i.e., when the insertion holes 126 and 128 become coaxial, the through holes 110 and 112 become substantially coaxial with respect to the through holes 108, and the through holes 118 and 120 become substantially coaxial with respect to the through holes 116).

A circular column-shaped fastening shaft 130 formed by a material that is materially stronger than the first housing member 90 (e.g., metal) and the second housing member 100 is inserted through the insertion hole 126. The outer diameter dimension of the body portion of the fastening shaft 130 is set to be just smaller than the inner diameter dimension of the shaft 80.

The distal end side of the fastening shaft 130 inserted through the insertion hole 126 from the side of the side wall 92 opposite from the side facing the upper wall 14 penetrates the shaft 80 fittingly inserted through the insertion holes 82 in both of the bearing members 42 and 44, and penetrates the insertion hole 128. A fastener 124 is attached to the distal end portion of the fastening shaft 130 penetrating the insertion hole 128 and protruding from the side of the side wall 102 opposite from the side facing the upper wall 14, and the upper wall 14, the first housing member 90, and the second housing member 100 are fastened and fixed together by the fastener 124 and the head portion of the fastening shaft 130.

Operation and Effect of the First Embodiment

Next, the operation and effect of the first embodiment will be described.
(Method of Assembling the Shift Lever Device 10)

First, the method of assembling the shift lever device 10 will be described.

When the shift lever device 10 is to be assembled, first, the fastening pins 122 and the fastening shaft 130 are inserted through the through holes 110 and 118 and the insertion hole 126 in the side wall 92 of the first housing member 90. Next, the bearing member 42 is attached to the fastening shaft 130 such that the fastening shaft 130 penetrating the insertion hole 126 penetrates the insertion hole 82 in the bearing member 42.

Next, in a state where the lever body 22 penetrates the shift groove 16, the bracket 24 is attached to the bearing member 42 from the opposite side of the first housing member 90 to the side facing the side wall 92 such that the leg plates 34 and 36 of the bracket 24 sandwich the body 46 of the bearing member 42. Moreover, at about the same time as the action of attaching the bracket 24 with respect to the bearing member 42, the fastening pins 122 penetrating the through holes 110 and 118 in the side wall 92 are inserted through the through holes 108 and 116 in the coupling portions 106 and 114 of the upper wall 14.

Next, the bearing member 44 is attached via the bracket 24 such that the leg plates 34 and 36 are sandwiched by the body 46 and both of the supports 50. When the bearing member 44 is attached, the fastening shaft 130 is inserted through the insertion hole 82 in the bearing member 44.

When the bearing member 44 is attached such that the fastening shaft 130 is inserted through the insertion hole 82, the joining protrusions 56 enter the joining holes 58 such that relative displacement (i.e., "shifting") of the bearing member 44 with respect to the bearing member 42 in the direction orthogonal to the protruding direction of the joining protrusions 56 (i.e., the direction orthogonal to the axial direction of the fastening shaft 130) is prevented. Moreover, as described above, an adhesive is applied to the end surfaces 52 of the supports 50 of at least either one of the bearing member 42 and the bearing member 44.

Consequently, when the bearing member 44 is attached and the end surfaces 52 of the supports 50 of the bearing members 42 and 44 abut against each other, the bearing members 42 and 44 are integrally joined together by the adhesive. When the bearing members 42 and 44 are integrally joined together in this manner, the cutout portions 54 of the supports 50 of the bearing member 42 and the cutout portions of the supports 50 of the bearing member 44 face each other, whereby circular holes are formed and the pins 40 of the bracket 24 are fittingly inserted into the circular holes such that the pins 40 are rotatable.

In this state, the bearing members 42 and 44 that have become integrated about the fastening shaft 130 are rotatable, and the bracket 24 becomes rotatable about the pins 40 (about the center axial lines of the circular holes formed by the cutout portions 54).

Next, the fastening pins 122 and the fastening shaft 130 are inserted through the through holes 112 and 120 and the insertion hole 128 in the side wall 102 of the second housing member 100. In a state where the distal end sides of the fastening pins 122 and the fastening shaft 130 inserted through the through holes 112 and 120 and the insertion hole 128 penetrate the through holes 112 and 120 and the insertion hole 128 and protrude from the side opposite from the side facing the first housing member 90, the fasteners 124 are attached to the distal ends of the fastening pins 122 and the fastening shaft 130. Thus, the upper wall 14, the first housing member 90, and the second housing member 100 are fastened and fixed together.

Here, as has been heretofore described, in the shift lever device 10, excluding the work of passing the lever body 22 through the shift groove 16, the work of assembling each of the members becomes, based on the fastening pins 122 and the fastening shaft 130, assembly from the distal end sides of the fastening pins 122 and the fastening shaft 130 to the proximal end (head portion) sides.

In this manner, in the shift lever device 10 where each of the members can be assembled from one direction, these members can be assembled while maintaining the orientation of the first housing member 90—to which the assembly of the bearing members 42 and 44, the bracket 24, and the second housing member 100 are easily assembled—such as a state where the distal ends of the fastening pins 122 and the fastening shaft 130 penetrating the through holes 110 and 118 and the insertion hole 126 in the side wall 92 of the first housing member 90 face up, for example. Thus, the operability of the assembly work can be extremely effectively improved.

Moreover, as described above, the shift lever device 10 can be assembled by assembling each of the members in order from the same direction. For this reason, when the assembly of the shift lever device 10 is automated by an automatic assembly device such as a robot, the operation of the robot arm or the like, for example, can be made into a simple operation such as a one-dimensional operation. As a result, the structure of the automatic assembly device such as a robot can be compacted and simplified, and the cost of the automatic assembly device itself can be made inexpensive.

Moreover, the bracket 24 of the lever body 22 and the control lever 70 are coupled together by assembling the bearing members 42 and 44 prior to assembling the second housing member 100. For this reason, the structure of the second housing member 100 does not inadvertently inhibit the lever body 22 or the control lever 70 during the work of coupling together the lever body 22 and the control lever 70.

Further, because the side of the first housing member 90 facing the second housing member 100 is open when the lever body 22 and the control lever 70 are coupled together, the structure of the first housing member 90 does not inadvertently inhibit the lever body 22 or the control lever 70 during the work of coupling together the lever body 22 and the control lever 70.

Thus, the work of coupling together the lever body 22 and the control lever 70 can be easily performed, and in this sense also, the operability of the assembly work can be extremely effectively improved.

Moreover, in the shift lever device 10, the pins 40—and therefore the lever body 22—are supported in the circular holes that are formed by causing the cutout portions 54 of the supports 50 formed in the bearing members 42 and 44 to face each other. Yet until the bearing member 42 and the bearing member 44 are joined together, the circular holes that support the pins 40 are basically nothing more than the semicircular cutout portions 54.

Consequently, as described above, in regard to fitting the pins 40 into the cutout portions 54 of the supports 50 of the bearing member 42, the pins 40 are not particularly inhibited, and in regard to fitting the pins 40 into the cutout portions 54 of the supports 50 of the bearing member 44, the pins 40 are not particularly inhibited.

In this manner, by ensuring that the pins 40 are sandwiched by the supports 50 of both of the bearing members 42 and 44 such that the pins 40 are fitted into the insides of the cutout portions, the lever body 22 and the control lever 70 can be easily coupled together, and in this sense also, the operability during the assembly work can be extremely effectively improved.

Further, in the shift lever device 10, the control lever 70 is axially supported by the fastening shaft 130 for fastening and fixing together the first housing member 90 and the second housing member 100. For this reason, the overall number of parts can be reduced.

Moreover, because the material strength of the fastening shaft 130 is stronger than that of the first housing member 90 and the second housing member 100, the first housing member 90 and the second housing member 100 can be reliably fastened and fixed together, and because the fastening shaft 130 is strong in this manner, it can reliably support the control lever 70 without breaking or sustaining damage due to the rotation of the control lever 70.

Moreover, because the control lever 70 can be reliably supported by the materially strong fastening shaft 130 alone, strength necessary to support the control lever 70 does not have to be given to the first housing member 90 and the second housing member 100. For this reason, the housing 12 can be made lightweight, and therefore the shift lever device 10 as a whole can be made lightweight.

Configuration of Second Embodiment

Next, a second embodiment of the invention will be described. For the purpose of describing the present embodiment, it will be noted that, in regard to members that are basically the same as those of the first embodiment, the same reference numerals will be given and description thereof will be omitted.

Figure 6:
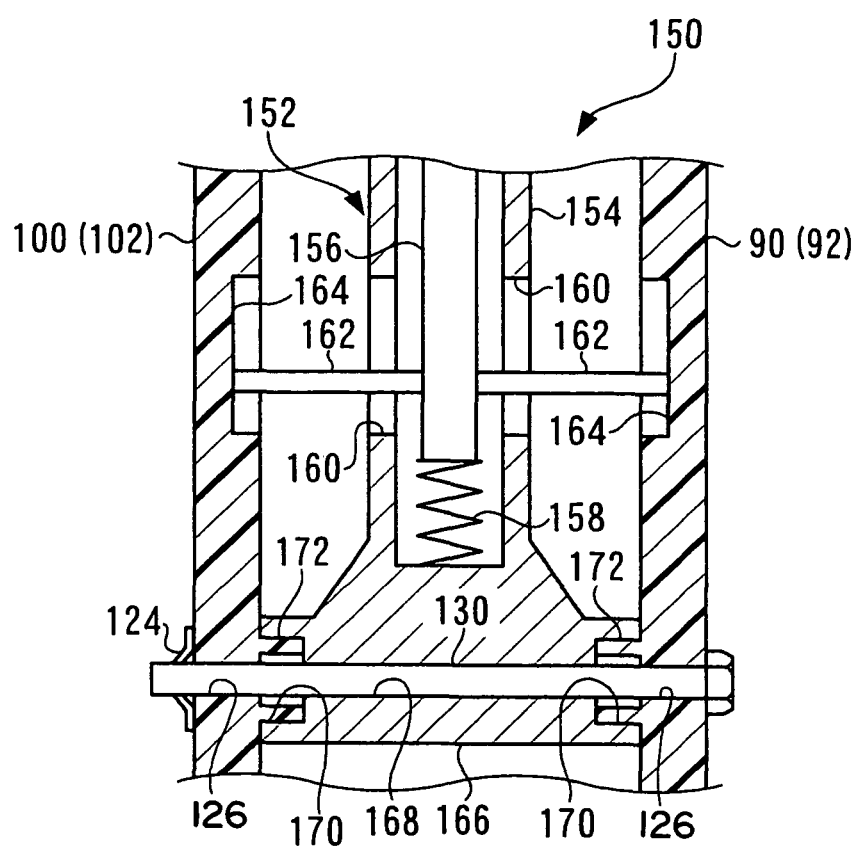
FIG. 6
A cross-sectional view showing the basics of the configuration of relevant portions of a shift lever device pertaining to a second embodiment of the invention.

In FIG. 6, the basics of the configuration of relevant portions of a shift lever device 150 pertaining to the present embodiment are shown by cross-sectional view.

As shown in FIG. 6, in this shift lever device 150, a shift lever 152 is disposed between the side wall 92 of the first housing member 90 and the side wall 102 configuring the second housing member 100 that configure the housing 12. The shift lever 152 is disposed with a lever body 154 that has a substantially circular bottomed cylinder shape (pipe shape).

A detent rod 156 is housed inside the lever body 154. The detent rod 156 is configured as a long rod along the longitudinal direction of the lever body 154. A compression coil spring 158 is disposed between the longitudinal-direction proximal end portion (lower end portion) of the detent rod 156 and the inner bottom portion of the lever body 154, and the detent rod 156 is biased by the biasing force of the compression coil spring 158 toward the distal end side (upward in FIG. 6) of the lever body 154.

The distal end portion of the detent rod 156 enters the inside of a knob (not shown) attached to the distal end portion of the lever body 154. A release button (not shown) is attached to the knob, so that when the release button is pushed, the detent rod 156 moves (downward) toward the inner bottom portion of the lever body 154 counter to the biasing force of the compression coil spring 158.

Further, a slit hole 160 is formed in the longitudinal-direction intermediate portion of the lever body 154. The slit hole 160 is configured as a long hole along the longitudinal direction of the lever body 154 and allows the inside and outside of the lever body 154 to be communicated. A detent pin 162 that protrudes from the outer peripheral portion of the detent rod 156 penetrates the slit hole 160. Detent holes 164 are formed in the side walls 92 and 102 in correspondence to the distal end sides of the detent pin 162, and the distal ends of the detent pin 162 penetrating the slit hole 160 enter the detent holes 164.

Although their detailed illustration is omitted, the inner peripheral portion positioned at the upper side of the detent holes 164 appropriately protrude downward, and these protruding portions inhibit the detent pin 162, whereby the movement of the detent pin 162 to the side of the protruding portions is restricted and the movement of the shift lever 152 is indirectly restricted. Further, the restricted state can be released by pushing the release button as described above in this restricted state and causing the detent rod 156 to move to a position where it can avoid inhibition by the protruding portions.

A cylindrical portion 166 is disposed on the proximal end portion of the lever body 154. The cylindrical portion 166 is configured to be long along the direction orthogonal to the longitudinal direction of the lever body 154 and along the direction in which the side wall 92 and the side wall 102 face each other, and the proximal end portion of the lever body 154 is integrally coupled to the outer peripheral portion of the longitudinal-direction intermediate portion of the cylindrical portion 166 (in FIG. 6, substantially the center).

Further, a cross-sectionally circular insertion hole 168 is formed in the axial center portion of the cylindrical portion 166, and fit-insertion holes 170 whose inner diameter dimensions are larger than that of the insertion hole 168 are formed in both longitudinal-(axial-) direction end sides of the cylindrical portion 166 coaxially with respect to the insertion hole 168 and the cylindrical portion 166. A positioning portion 172 that protrudes from the side wall 92 toward the side wall 102 enters one of the fit-insertion holes 170, and a positioning portion 172 that protrudes from the side wall 102 toward the side wall 92 enters one of the fit-insertion holes 170.

The positioning portions 172 are formed in substantially circular cylinder shapes whose outer diameter dimensions are smaller than the inner diameter dimensions of the fit-insertion holes 170, so that by inserting the positioning portions 172 into the fit-insertion holes 170 when the shift lever device 150 is to be assembled, the shift lever 152 is positioned with respect to the first housing member 90 and the second housing member 100.

Moreover, insertion holes 126 are formed coaxially in the positioning portions 172, and the insertion holes 126 are open at the distal end portions of the positioning portions 172. Both of the insertion holes 126 are coaxially continuous with respect to the insertion hole 168 in a state where the positioning portions 172 have been fit-inserted into the fit-insertion holes 170, and the fastening shaft 130 inserted through the insertion hole 126 in the side wall 92 penetrates the insertion hole 168 to support the cylindrical portion 166 (i.e., the shift lever 152) such that the cylindrical portion 166 is rotatable about the fastening shaft 130.

That is, in contrast to the shift lever device 10 pertaining to the first embodiment, the present shift lever device 150 is a "straight" shift lever device 150 that is rotatingly operated only about the fastening shaft 130, and when the shift lever 152 reaches a predetermined rotational position (shift position) about the fastening shaft 130, the shift range is changed to a shift range corresponding to the rotational position of the shift lever 152 among plural shift ranges set in the automatic transmission.

Moreover, the fastening shaft 130 penetrating the insertion hole 168 penetrates the insertion hole 126 formed in the side wall 102, and the fastener 124 is attached thereto such that the upper wall 14 (not shown in FIG. 6), the first housing member 90, and the second housing member 100 are fastened and fixed together by the fastener 124 and the head portion of the fastening shaft 130.

Operation and Effect of the Second Embodiment

As described above, in the shift lever 152 as well, the work of passing the lever body 154 through the shift groove 16 (not shown in FIG. 6) can be excluded, the work of assembling each of the members becomes, assembly building around the fastening pins 122 (not shown in FIG. 6) and the fastening shaft 130, from the distal end sides of the fastening pins 122 and the fastening shaft 130 to the proximal end (head portion) sides thereof.

In this manner, in the shift lever device 150 where each of the members can be assembled from one direction, these members can be assembled while maintaining the orientation of the first housing member 90—to which the assembly of the second housing member 100 and the like are easily assembled—such as a state where the distal ends of the fastening pins 122 and the fastening shaft 130 penetrating the through holes 110 and 118 (not shown in FIG. 6) and the insertion hole 126 in the side wall 92 of the first housing member 90 face up, for example. Thus, the operability of the assembly work can be extremely effectively improved.

Moreover, as described above, the shift lever device 150 can be assembled by assembling each of the members in order from the same direction. For this reason, when the assembly of the shift lever device 150 is automated by an automatic assembly device such as a robot, the operation of the robot arm or the like, for example, can be made into a simple operation such as a one-dimensional operation. As a result, the structure of the automatic assembly device such as a robot can be made compact and simplified, and the cost of the automatic assembly device itself can be made inexpensive.

Further, in the shift lever device 150, the shift lever 152 is rotatably axially supported by the fastening shaft 130 for fastening and fixing together the first housing member 90 and the second housing member 100. Here, as was described in the first embodiment, the material strength of the fastening shaft 130 is higher than that of the first housing member 90 and the second housing member 100.

For this reason, tension in the rotational radial direction when the shift lever 152 is rotatingly operated can be reliably received by the fastening shaft 130. Thus, the positioning portions 172 and the like of the first housing member 90 and the second housing member 100 can simply be used just for positioning when assembling the shift lever 152, and do not have to contribute to mechanical strength at a time of supporting the shift lever 152. For this reason, the housing 12 can be made lightweight, and therefore the shift lever device 10 as a whole can be made lightweight.

DESCRIPTION OF THE REFERENCE NUMERALS

10 Shift Lever Device
12 Housing
20 Shift Lever
22 Lever Body (Second Lever Member)
42 Bearing Member
44 Bearing Member
50 Supports
70 Control Lever (First Lever Member)
90 First Housing Member
100 Second Housing Member
130 Fastening Shaft (Fastener)
150 Shift Lever Device
152 Shift Lever

The invention claimed is:

1. A shift lever device for operating a vehicle mounted transmission by pivoting operation of a shift lever about a first and second axes, the shift lever device comprising:
a housing configured by a first housing member that is disposed on one side of the shift lever in a predetermined direction and a second housing member that is assembled to the first housing member along the predetermined direction from a side of the shift lever opposite to the side facing the first housing member with the shift lever therebetween, with the shift lever being axially supported inside the housing such that the shift lever is pivotable about the first axis whose axial direction is the predetermined direction;
wherein the shift lever comprises a first lever member that is directly or indirectly axially supported inside the housing such that the first lever member is pivotable about the first axis whose axial direction is the predetermined direction and a second lever member disposed with on a pivot shaft that extends in a direction intersecting the predetermined direction; and
wherein the shift lever device further comprises first and second bearing members where one is assembled to the other from the predetermined direction with the second lever member therebetween such that they are fixed and integrally coupled to the second lever member such that said first and second bearing members integrally move along with said second lever member relative to the first and second housing members, and wherein supports disposed on both the first and the second bearing members sandwich the pivot shaft from the predetermined direction such that the pivot shaft is pivotably supported by both the supports in a state where the first bearing member is coupled to the second bearing member, wherein the shift lever includes the first lever member and the second lever member integrally coupled together by the first and second bearing members and is operated by pivoting about the first axis whose axial direction is the predetermined direction and about the second axis whose axial direction is the direction of extension of the pivot shaft, and wherein a pair of semi-circular arc-shaped cutout portions are disposed in the supports of the first and second bearing members, and the pivot shaft is supported to be rotatable about the second axis by circular holes formed by the cutout portions.

2. The shift lever device of claim 1, wherein the first and second bearing members have substantially identical shapes but whose orientations face opposite directions in a direction orthogonal to the second axis of the pivot shaft.

3. The shift lever device of claim 1, further comprising fastener means that penetrates the first housing member and the second housing member along the predetermined direction, penetrates the shift lever between the first housing member and the second housing member, and supports the shift lever such that the shift lever is pivotable about the first axis whose axial direction is the predetermined direction.

4. The shift lever device of claim 3, wherein the fastening means is materially stronger than the first housing and second housing members.

5. The shift lever device of claim 3, wherein the fastener means includes a fastening shaft that successively penetrates the first housing member, a hollow shaft of the first lever member fit-inserted into insertion holes in the first and second bearing members, and the second housing member.

6. The shift lever device of claim 5, wherein a fastening member is attached to a distal end side of the fastening shaft.

* * * * *